United States Patent [19]
Marmarelis et al.

[11] Patent Number: 6,044,336
[45] Date of Patent: Mar. 28, 2000

[54] METHOD AND APPARATUS FOR SITUATIONALLY ADAPTIVE PROCESSING IN ECHO-LOCATION SYSTEMS OPERATING IN NON-GAUSSIAN ENVIRONMENTS

[75] Inventors: Vasilis Z. Marmarelis, Irvine; Chrysostomos L. Nikias, Rancho Palos Verdes; Dae Cheol Shin, Diamond Bar, all of Calif.

[73] Assignee: Multispec Corporation, Huntington Beach, Calif.

[21] Appl. No.: 09/114,563

[22] Filed: Jul. 13, 1998

[51] Int. Cl.[7] ............................... G01S 15/00; G04B 1/10
[52] U.S. Cl. ...................... 702/190; 702/191; 342/159; 367/87
[58] Field of Search .................................. 702/190, 191, 702/199, 181; 342/159, 189; 375/232, 346; 367/87

[56] References Cited

U.S. PATENT DOCUMENTS

| | | | |
|---|---|---|---|
| 4,719,466 | 1/1988 | Farina et al. | 702/191 |
| 4,933,914 | 6/1990 | Feintuch et al. | 367/87 |
| 5,282,225 | 1/1994 | Nikias et al. | 375/232 |
| 5,337,055 | 8/1994 | Ghignoni | 342/159 |
| 5,517,531 | 5/1996 | Bond et al. | 375/346 |
| 5,546,084 | 8/1996 | Hindman | 342/161 |
| 5,550,759 | 8/1996 | Bond | 702/199 |
| 5,694,342 | 12/1997 | Stein | 702/190 |
| 5,760,732 | 6/1998 | Marmarelis et al. | 342/189 |

*Primary Examiner*—Patrick Assouad
*Assistant Examiner*—Bryan Bui
*Attorney, Agent, or Firm*—Price, Gess & Ubell

[57] ABSTRACT

A signal processing method for use in echo-location systems (radar, sonar, laser radar) to obtain accurate estimates of the target reflectivity sequence in a random (non-Gaussian) noise environment, including ambient noise, reverberation, and clutter. The method derives the statistical characteristics of the random background environments and then constructs and maximizes the corresponding approximate likelihood function using iterative methods. The approximate maximum likelihood estimates are generated on the basis of an approximation of the ideal likelihood function which is maximized using computationally efficient algorithms.

16 Claims, 11 Drawing Sheets

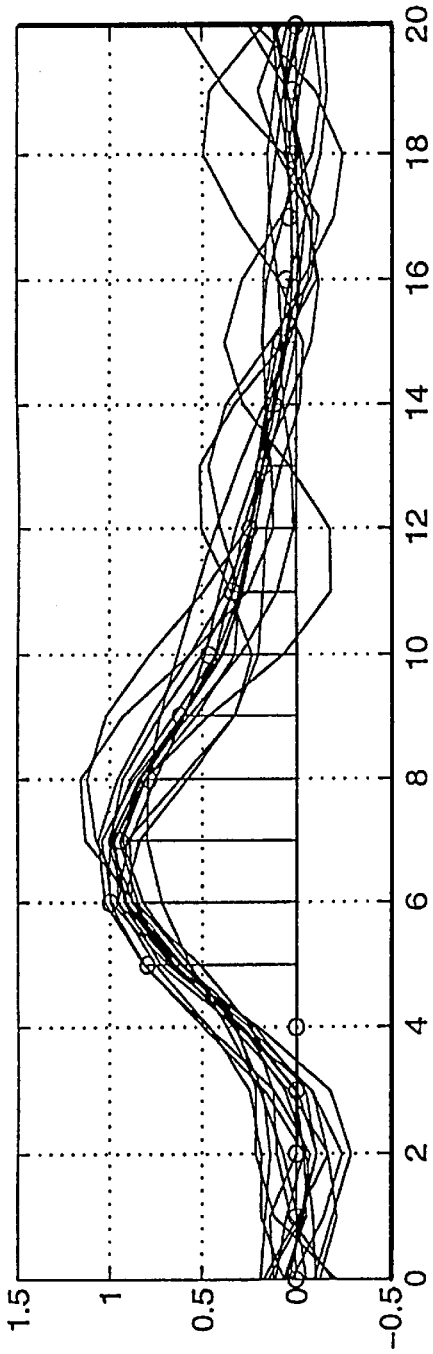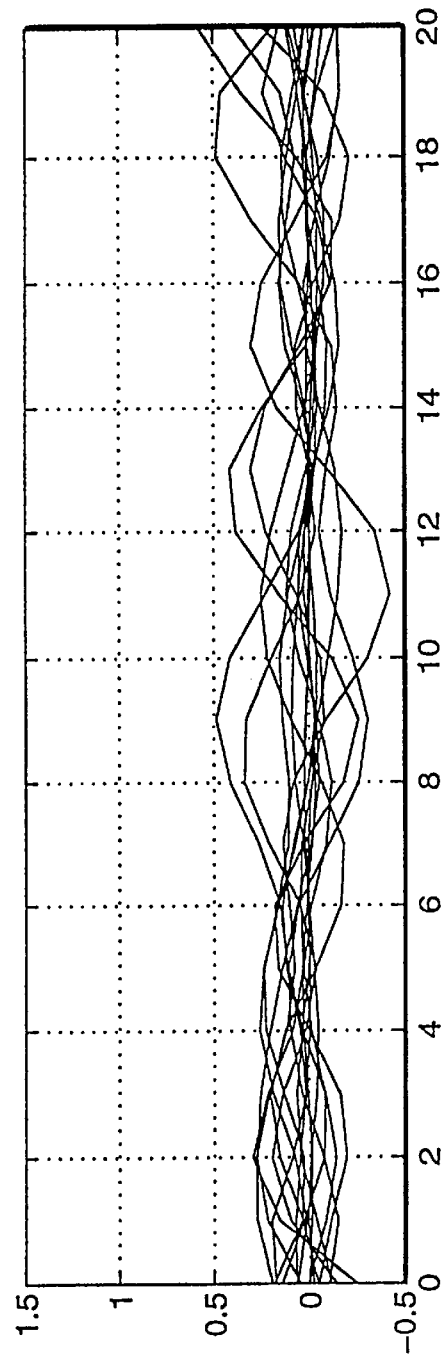

METHOD AND APPARATUS FOR SITUATIONALLY ADAPTIVE PROCESSING IN ECHO-LOCATION SYSTEMS OPERATING IN NON-GAUSSIAN ENVIRONMENTS

BACKGROUND OF THE INVENTION

1. Field of the Invention

The present invention relates to echo-location systems and more specifically pertains to a method of likelihood estimation to obtain optimum performance of echo-location systems in environments of non-Gaussian disturbances such as clutter, reverberation or noise.

2. Description of Related Art

Signal processing in echo-location systems (radar, sonar, laser radar) seeks to obtain accurate estimates of the target reflectivity sequence from the transmitted/received data. The received date includes the effects of environmental disturbances (i.e., ambient noise and propagation effects such as reverberation and clutter) that have a random character, the amount and the statistical characteristics of these environmental disturbances influence the accuracy of the estimated target reflectivity sequence.

Current processing methods are designed to yield optimal estimates for Gaussian environments. The Gaussian (normal) distribution has played a dorminant role in signal processing and often leads to analytically tractable solutions. In many instances of practical interest, however, the statistical environment deviates from the Gaussian assumption. For example, underwater acoustic signals, low frequency atmospheric noise, specular scattering, and many types of man-made noise are found to be non-Gaussian. Performance degradation for systems operating in environments with a significant non-Gaussian component but optimized under the Gaussian assumption, such as the replica correlation (matched filter) processing for coherent reception employed by current radar and sonar systems, leads to an increased false alarm rate with serious practical consequences. The present invention takes the non-Gaussian component of an environment into consideration when estimating target reflectivity. The present invention estimates first the statistics of the prevailing environmental disturbances and then uses those to obtain the optimal estimates of the target reflectivity sequence by means of an adaptive (iterative) estimation algorithm based on the maximization of the corresponding likelihood function.

OBJECTS AND SUMMARY OF THE INVENTION

It is an object of this invention to provide a method for adaptively estimating the target-channel kernel (reflectivity sequence) from received data corrupted by environmental non-Gaussian, reverberation or ambient noise.

This object and the general purpose of this invention is accomplished by providing a method that derives statistical characteristics of the environmental disturbances and then constructs and maximizes the corresponding approximate likelihood function using iterative methods. A widely accepted measure of estimation accuracy is the estimation variance which is minimized when the "likelihood function" of the received data is maximized. Since the "likelihood function" is defined by the statistical characteristics of the environmental disturbances, knowledge of the latter affords the prospect of optimal estimation. This is the crux of the present invention, i.e., to characterize the prevailing environmental statistics to each situation and use it to construct an approximate likelihood function, maximization of which yields the desired optimal estimates of the target reflectivity sequence. The present invention seeks the optimal estimation of the target reflectivity sequence $\underline{h}$ for given data $\underline{y}$ and X in a way that minimizes the estimation variance by maximizing the likelihood function for given statistics of $\underline{\epsilon}$. Because of the onerous requirements of precise maximnum likelihood estimation, the present invention generates approximate maximum likelihood estimates based on an approximation of the ideal likelihood function, $\hat{L}(\underline{\epsilon})$, which is maximized by employing computationally efficient adaptive algorithms.

BRIEF DESCRIPTION OF THE DRAWINGS

The exact nature of this invention, as well as its objects and advantages, will become readily apparent upon reference to the following detailed description when considered in conjunction with the accompanying drawings, in which like reference numerals designate like parts throughout the figures thereof, and wherein:

FIG. 5 is a graph of target kernel estimates obtained by SALT processing in Cauchy noise for SNR=−20 dB;

FIG. 6 is a graph of estimates (in the absence of the target) obtained by SALT processing in Cauchy noise for SNR=−20 dB;

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a method and apparatus for processing reflected data in non-Gaussian environments to estimate and detect targets.

Figure 1:
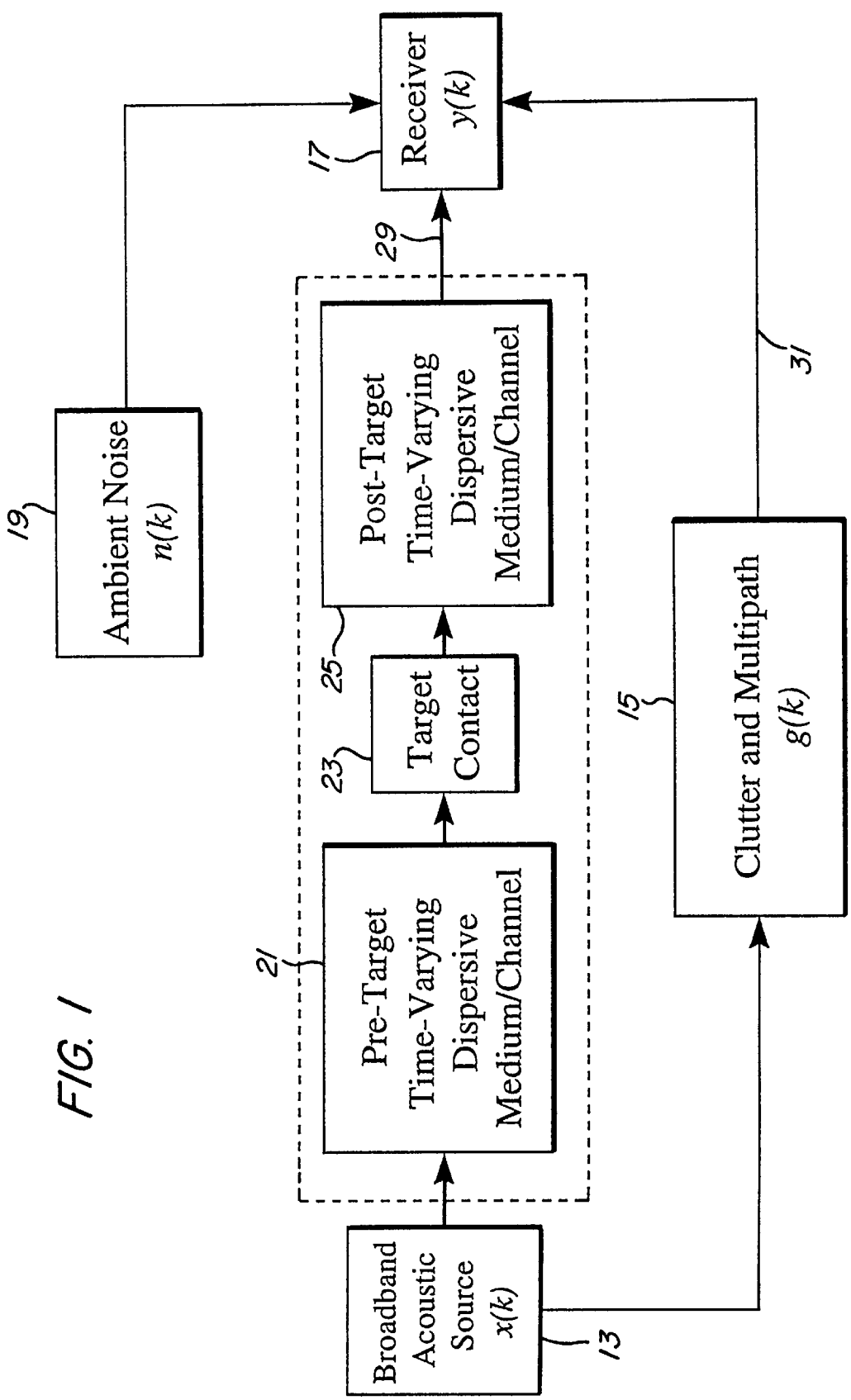
FIG. 1 is a block diagram of the extended target-channel model (ETCM)

To describe the present invention, we use the extended target-channel model (ETCM), of FIG. 1, for the problem of target estimation/detection in general non-Gaussian environments of clutter/reverberation and noise. This model incorporates the dispersive time-varying characteristics of the propagation medium and the dynamic time-varying characteristics of the target(s) in the form of channel and target kernels, respectively. The effect of clutter/reverberations is modeled as a convolution between the transmitted waveform and a stochastic kernel representing the multiple, randomly dispersed environmental scatterers that are the sources of the clutter/reverberation. Ambient noise is distinct from clutter/reverberation and is modeled as an independent random signal added to the received signal. The signal processing model is given by:

$$y(k)=v(k)+z(k)+n(k) \tag{1}$$

where n(k) is the additive ambient noise 19 and $$v(k)=h(k)*x(k)$$

$$z(k)=g(k)*x(k) \tag{2}$$

represent the signal of interest v(k), which is the convolution of the transmittal signal x(k) 13 with a deterministic target-channel kernel h(k) 27 composed of the cascade of the target kernel (i.e., the target reflectivity sequence) 25 and the associated channel (propagation) kernel 21; and the clutter/reverberation signal z(k) 31 which is the convolution of the transmitted signal x(k) 13 with the stochastic kernel g(k) 15 which represents collectively all multiple natural scatterers and their associated channel (propagation) effects. Since the clutter/reverberation and the noise signals are random and viewed as undesirable disturbances added to the signal-of-interest, they can be lumped together in a random disturbance term:

$$\epsilon(k)=z(k)+n(k) \tag{3}$$

for modeling and estimation purposes. The key distinction is that the clutter/reverberation signal z(k) is dependent on the x(k), while the noise signal n(k) is independent of x(k). For a set of discrete-time data, the model equation can be put into vector-maxtrix form as:

$$\underline{y}=X\underline{h}+\underline{\epsilon} \tag{4}$$

where $\underline{y}$ and $\underline{\epsilon}$ are the vectors of received data and errors (or disturbances), respectively, $\underline{h}$ is the vectorized target-channel kernel, and X is the Toeplitz matrix composed of time-shifted values of the transmitted signal in accordance with the model equation.

Various conventional estimators for the model equation given in Equation (4) are available based on least-squares fitting:
1. Ordinary Least-Squares (OLS) estimate: $\hat{\underline{h}}_{OLS}=[X^TX]^{-1}X^T\underline{y}$, where T denotes the transpose operation;
2. Generalized Least-Squares (GLS) estimate has: $\hat{\underline{h}}_{GLS}=[X^TC^{-1}X]^{-1}X^TC^{-1}\underline{y}$ where C denotes the error variance matrix;
3. Iterative Least-Squares (ILS) estimate: $\hat{\underline{h}}_{j+1}=\hat{\underline{h}}_j+\gamma X^T\hat{\underline{\epsilon}}_j$, where j denotes the iteration index and γ is the step-size of this iterative procedure.

Although these least-squares (LS) algorithms have an illustrious track record in applied science and engineering, they are optimal only for Gaussian errors and can yield rather inaccurate estimates when the statistics of the error terms deviate significantly from Gaussian. The optimal estimate achieves the theoretical minimum variance given by the Cramer-Rao bound by maximization of the likelihood function, as discussed earlier.

The present invention seeks adaptive estimates of target-channel kernels h(k) 27 from given transmit/receive data, x(k) 13 and y(k) 17 respectively, in the presence of non-Gaussian noise and clutter/reverberation, ϵ(k), according to the basic equation:

$$y(k)=h(k)*x(k)+\epsilon(k) \tag{5}$$

where * denotes convolution.

The main procedural steps of the present invention are:
1. the statistics of the prevailing non-Gaussian clutter/reverberation/noise are estimated in each case from on-line measurements by fitting the data histogram to broad classes of parametric distributions;
2. these estimated clutter/reverberation/noise statistics are used to construct an approximate likelihood function of the statistical model which is maximized with respect to the unknown model parameters using an iterative method.

Step 1 is operationally critical and makes the approach situationally adaptive—a feature of fundamental importance in actual applications. Step 2 relies on the celebrated optimality of maximum likelihood estimation to yield near optimal estimates of the parameters (or kernels) of interest in a practically tractable and computationally efficient manner using approximations of the ideal likelihood function. Optimality concerns the achievement of minimum variance for the obtained parameter (or kernel) estimates.

When the selected probability density function (p.d.f.) of the disturbances or errors (clutter/reverberation/noise) from Step 1 is denoted by $\underline{p}(\underline{\epsilon})$, the likelihood function for N independent samples $\{\epsilon_1, \epsilon_2, \ldots, \epsilon_N\}$ is $$L(\epsilon_1, \epsilon_2, \ldots, \epsilon_N) = \prod_{n=1}^{N} p(\epsilon_n) \tag{6}$$

where $$\epsilon_n = \epsilon(n) = y(n) \cdot \sum_{m=0}^{M} h(m)x(n-m) \tag{7}$$

with y(n) and x(n) denoting the n-th sample of the received and transmitted signals, respectively, and h(m) denoting the unknown discrete kernel values (i.e., the target reflectivity sequence) that we seek to estimate by maximizing the likelihood function.

In many cases, it is more convenient to maximize the log-likelihood function (LLF):

$$\log L(\epsilon_1, \epsilon_2, \ldots, \epsilon_N) = \sum_{n=1}^{N} \log p(\epsilon_n) \tag{8}$$

The maximum-likelihood estimate (MLE) of the kernel vector $\underline{h}=[h(0),h(1), \ldots, h(M)]^T$ is obtained when the gradient of log L with respect to $\underline{h}$ becomes zero. Since:

$$\frac{\partial}{\partial h(m)} \log L(\epsilon_1, \epsilon_2, \ldots, \epsilon_N) = \sum_{n=1}^{N} \frac{\partial p(\epsilon_n)}{\partial h(m)} \Big/ p(\epsilon_n) \tag{9}$$

this maximization condition typically leads to a system of nonlinear equations that can only be solved numerically. Maximization can be achieved through an iterative gradient-descent algorithm which updates the kernel estimated at the j+1 iteration as:

$$h^{(j+1)}(m) = h^{(j)}(m) + \gamma_j \frac{\partial \log L}{\partial h(m)} \quad (10)$$

where $\gamma_j$ is a (possibly variable) step size. The present invention seeks near-optimal "approximate maximum likelihood" estimates based on an approximation $\hat{L}(\epsilon_1 \ldots, \epsilon_N)$ of the ideal likelihood function, $L(\epsilon_1 \ldots, \epsilon_N)$, obtained by fitting a broad parametric class of p.d.f.'s to the data histogram.

As an example, when the bi-parametric class of p.d.f.'s has the form:

$$p(\epsilon) = \frac{c}{\lambda^2 + |\epsilon|^\beta} \quad (11)$$

where $\lambda$ and $\beta$ are two free parameters, and c is a scaling constant, dependent on $\lambda$ and $\beta$, securing unity area under the p.d.f. curve, it can be used to construct the LLF of the N independent samples as:

$$\log L(\epsilon_1, \ldots, \epsilon_N) = N \log c - \sum_{n=1}^{N} \log[\lambda^2 + |\epsilon_n|^\beta] \quad (12)$$

The gradient of this LLF is composed of the partial derivatives:

$$\frac{\partial \log L}{\partial h(m)} = \beta \sum_{n=1}^{N} x(n-m) \frac{|\epsilon_n|^{\beta-1} sgn(\epsilon_n)}{\lambda^2 + |\epsilon_n|^\beta} \quad (13)$$

where sgn (.) is the sign function. This gradient can be computed at each iteration j to allow adaptive estimation of the kernel values according to Eq. (10). It should be understood that other parametric classes of p.d.f.'s such as:

1. $p(\epsilon) = c e^{-\lambda |\epsilon|^\beta}$ or
2. $p(\epsilon) = c |\epsilon|^\alpha e^{-\lambda |\epsilon|^\beta}$ may be utilized, as well as other like p.d.f.'s.

The following illustrative results from computer-simulated examples demonstrate the efficacy of the present invention and its superior performance over conventional replica correlation (matched filter) processing for non-Gaussian clutter/reverberation/noise environments.

Figure 2:
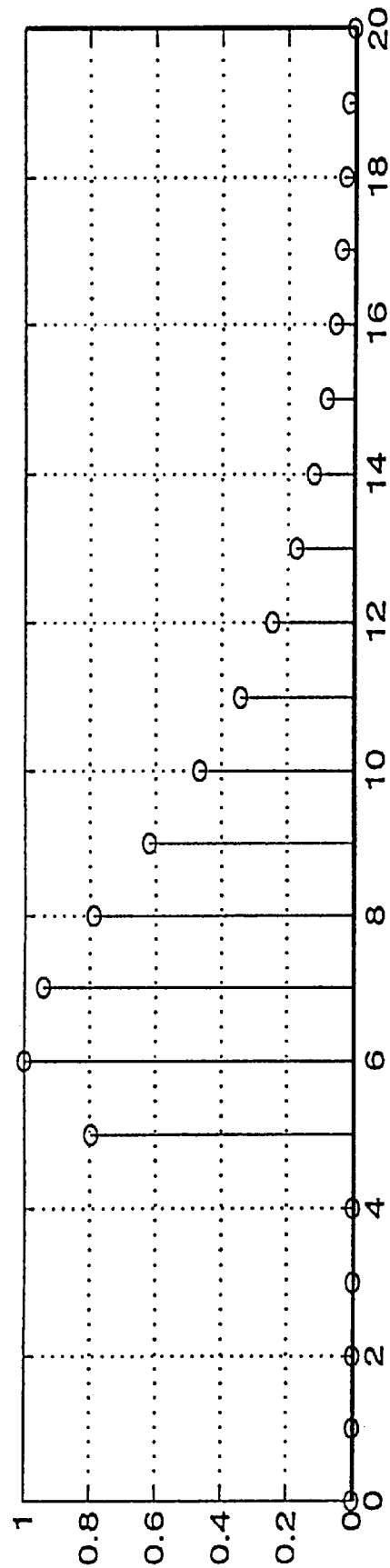
FIG. 2 is a graph of a target-channel kernel.
Figure 3:
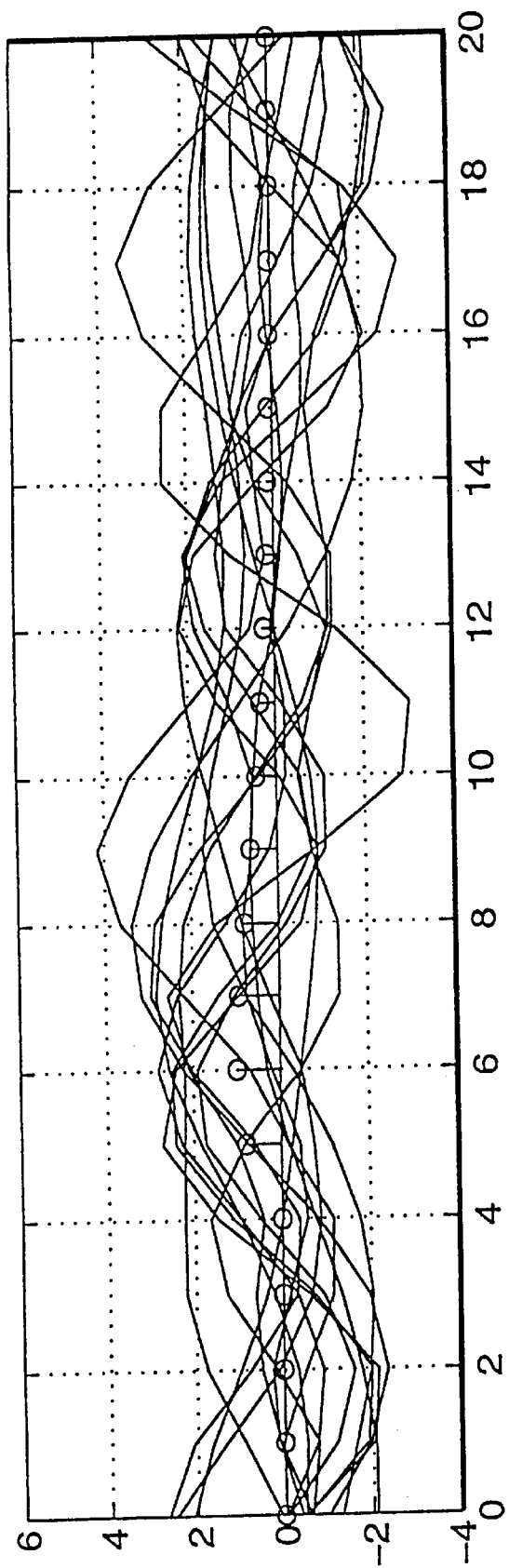
FIG. 3 is a graph of a target kernel estimates obtained by RC processing in Cauchy noise for SNR=−20 dB.
Figure 4:
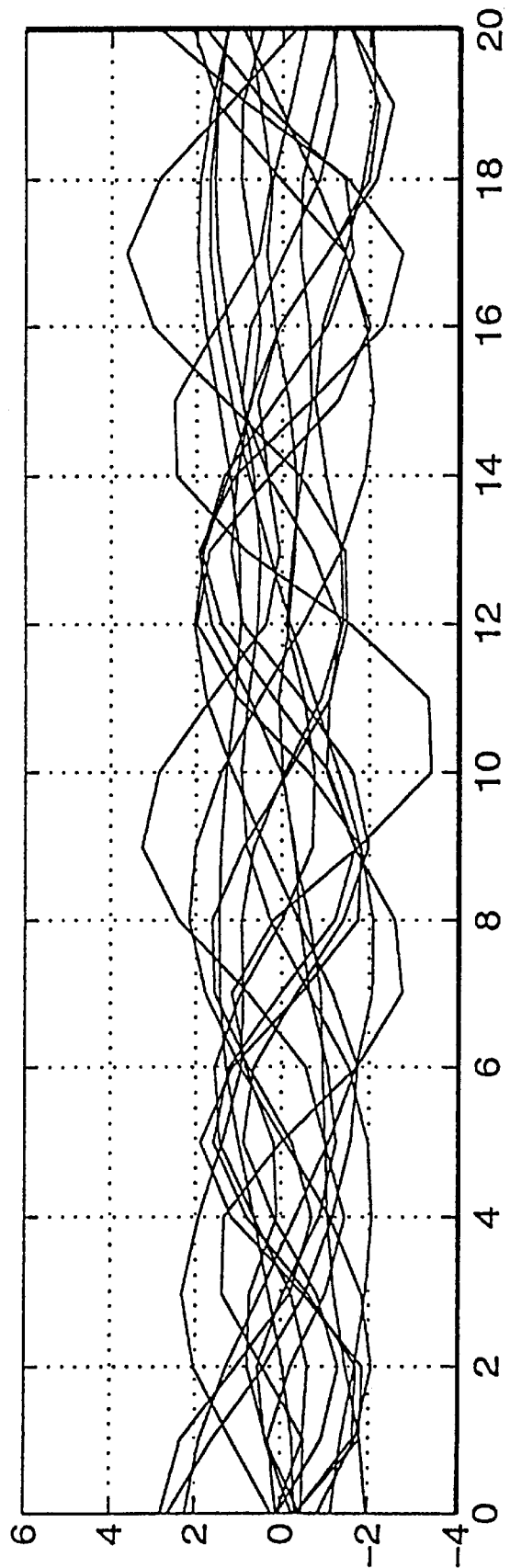
FIG. 4 is a graph of estimates (in the absence of the target) obtained by RC processing in Cauchy noise for SNR=−20 dB.

We consider first the Cauchy noise case having a p.d.f given by Eq. (11) for $\beta=2$. Estimates are obtained in the presence and absence of the target shown in FIG. 2 using both the present invention (termed SALT: Situationally Adaptive Likelihood Technique) and conventional replica correlation (RC). The results of 16 independent trials of RC processing in FIG. 3 and FIG. 4 for signal-to-noise ratio (SNR)=−20 dB in the presence of the target of FIG. 2 (FIG. 3), and in the absence of the target of FIG. 2 (FIG. 4) show that the target kernel is not visually evident. The corresponding results obtained by the present invention (SALT) are shown in FIG. 5 and FIG. 6. The estimates of the target kernel obtained by the present invention (FIG. 5) have far smaller variance than RC processing (FIG. 3) and so do the estimates in the absence of the target kernel (FIGS. 6 and 4, respectively), resulting in a higher probability of detection in the presence of target and a smaller probability of false alarm in the absence of target.

Figure 7:
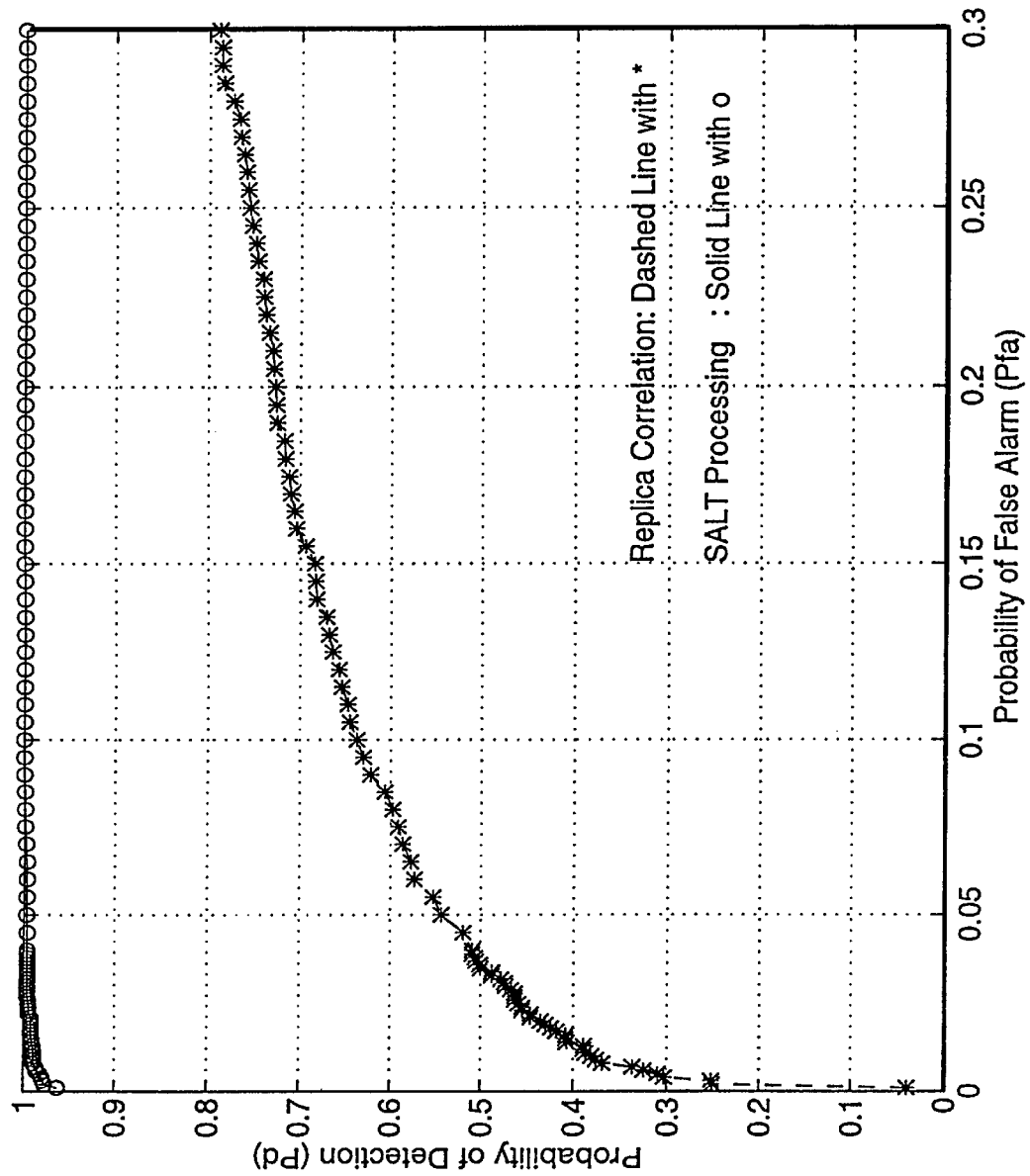
FIG. 7 is a graph of probability of detection (peak detection) versus probability of false alarm for −15 dB Cauchy noises.
Figure 8:
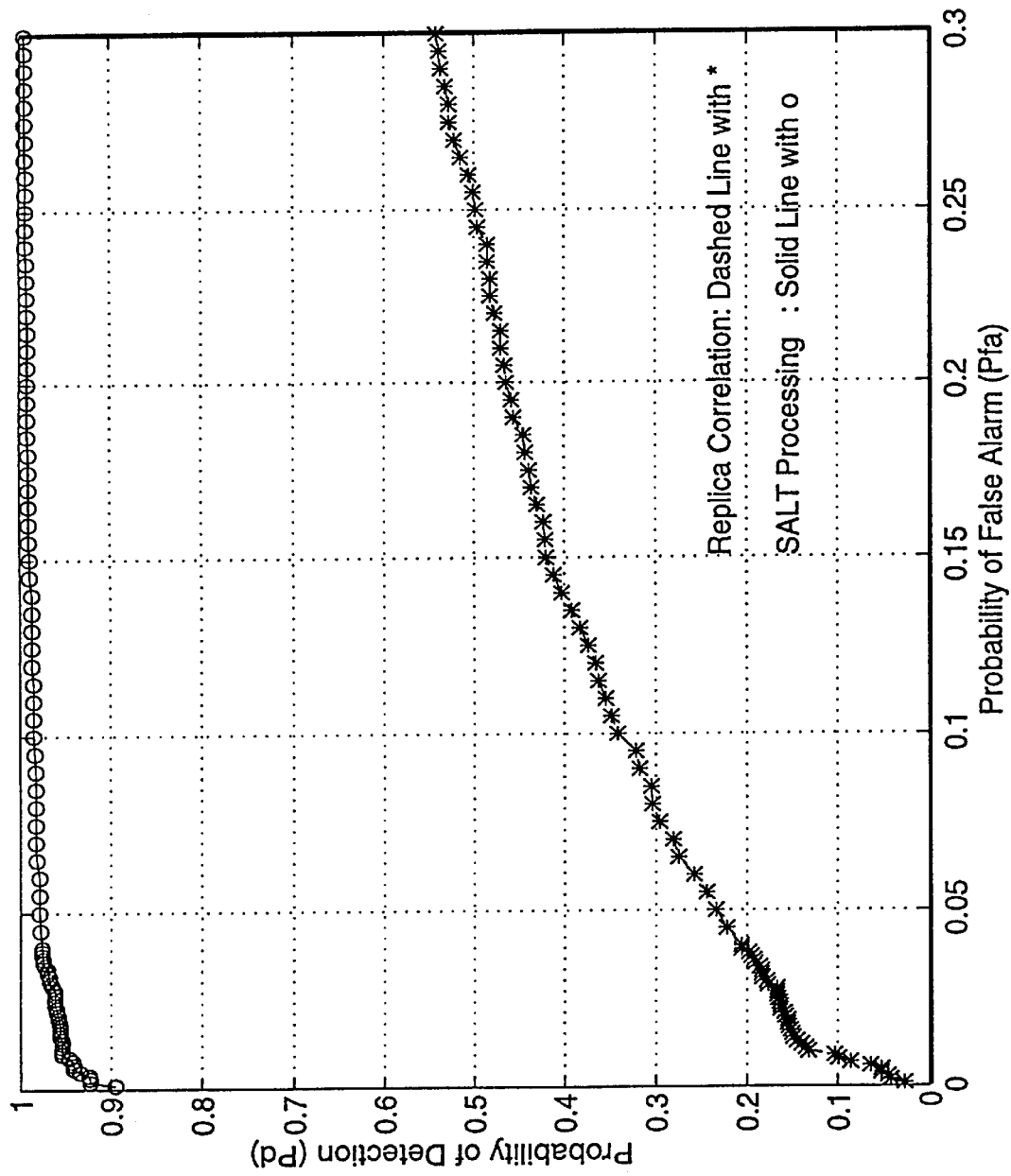
FIG. 8 is a graph of probability of detection (peak detection) versus probability of false alarm for −20 dB Cauchy noises.
Figure 9:
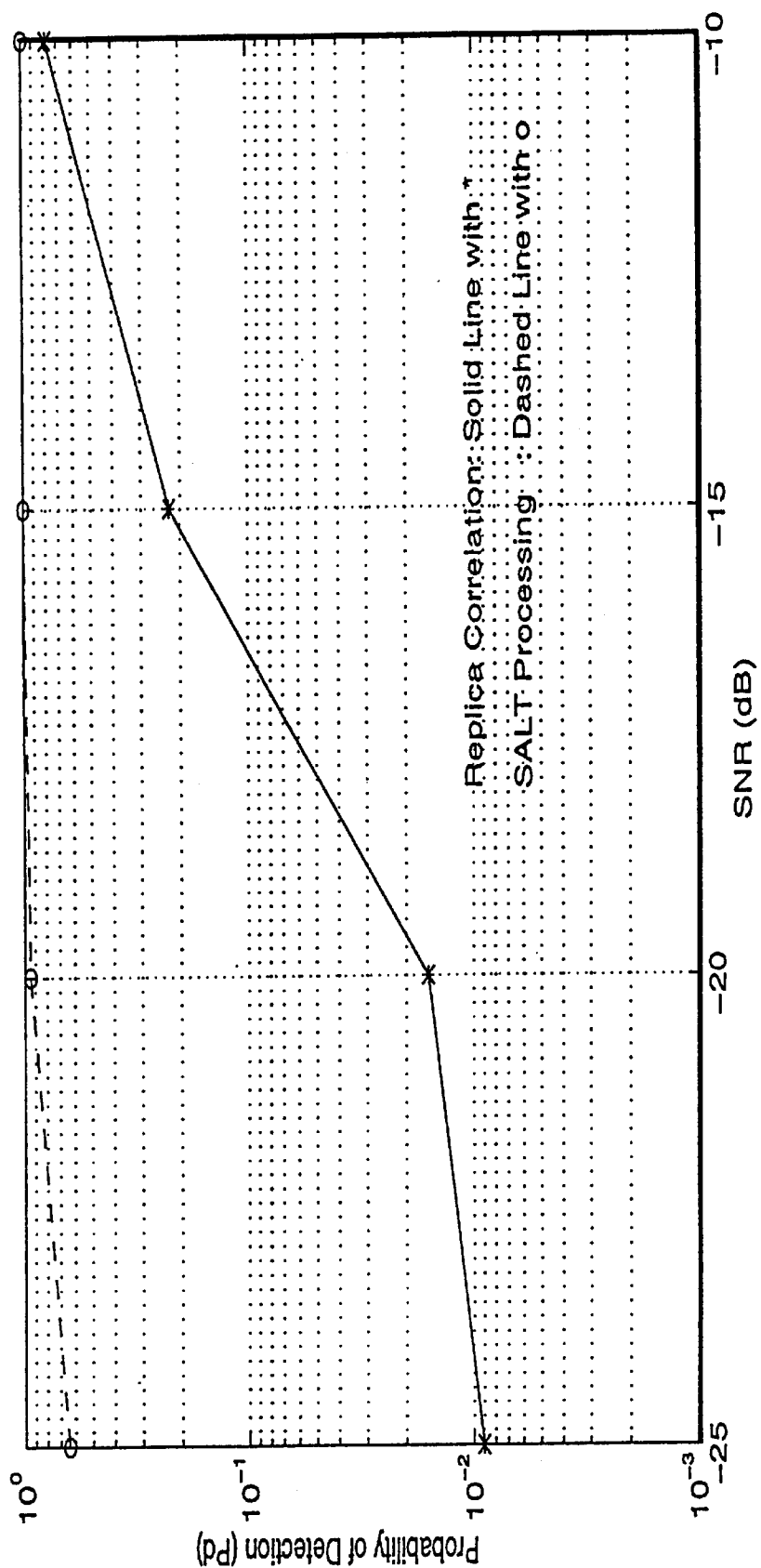
FIG. 9 is a graph of probability of detection (peak detection) versus SNR at $P_{FA}=0.001$ for Cauchy noises.
Figure 10:
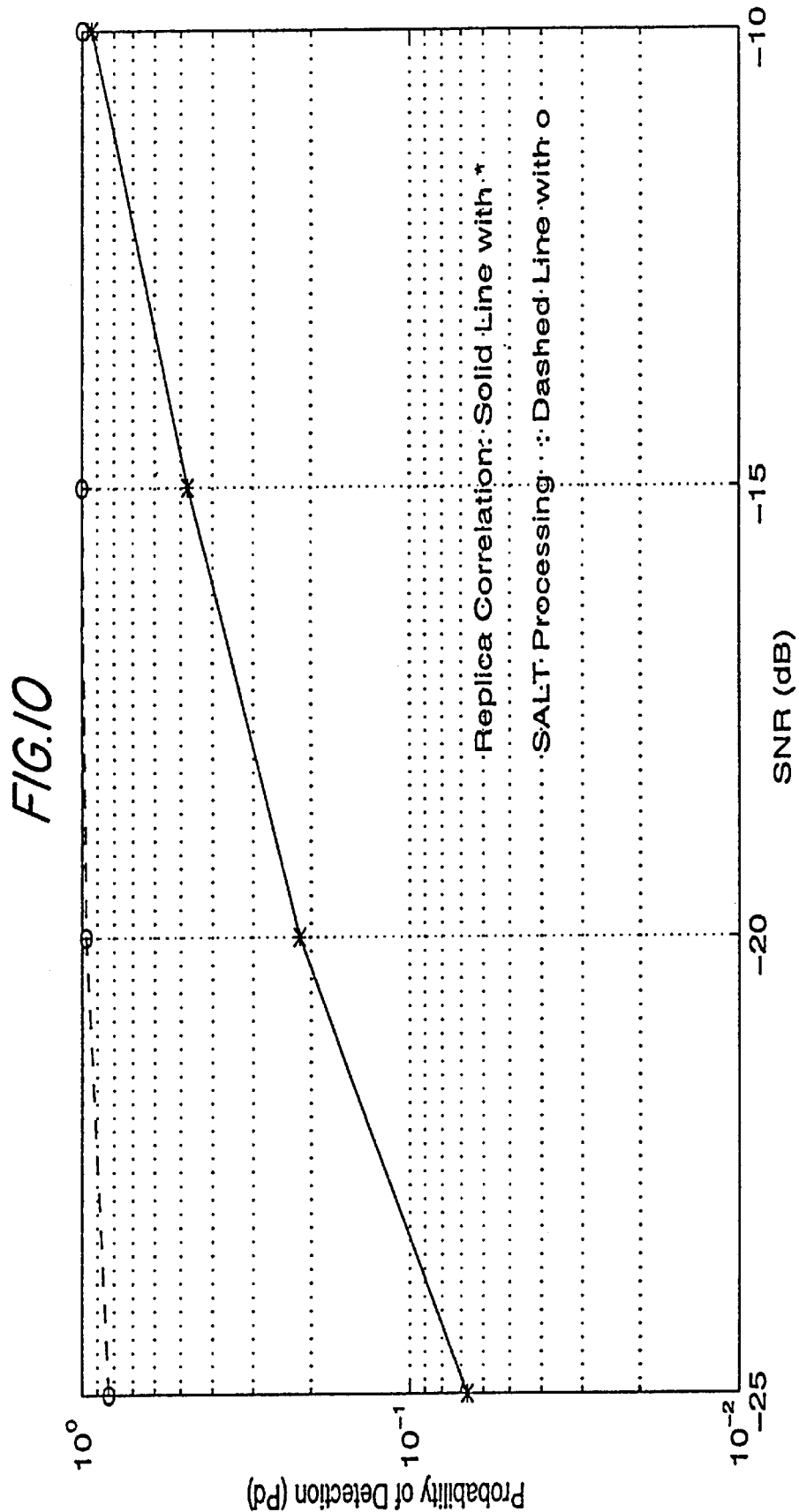
FIG. 10 is a graph of probability of detection (peak detection) versus SNR at $P_{FA}=0.01$ for Cauchy noises.

FIGS. 7 and 8 show "receiver operating characteristics" (ROC) curves that are widely accepted as the figure of merit in assessing quantitatively the performance of detection algorithms, when the signal of interest is corrupted by Cauchy noise for SNR of −15 (FIG. 7) and −20 dB, (FIG. 8). The ROC curves are constructed through numerous Monte-Carlo runs and the peak detection criterion at a specified range. They represent the relation between probability of detection, $P_d$, and probability of false alarm, $P_{fa}$. The difference in performance grows bigger with decreasing SNR. The superiority of SALT processing becomes truly impressive for very low SNRs, i.e., much higher $P_d$ for given $P_{fa}$, or much lower $P_{fa}$ for given $P_d$. In order to demonstrate the improvement achieved with SALT processing for constant $P_{fa}$, we plot the probability of detection $P_d$ VS SNR in FIGS. 9 and 10 for $P_{fa}$ 0.01 (FIG. 9) and $P_{fa}$ 0.001 (FIG. 10).

Figure 11:
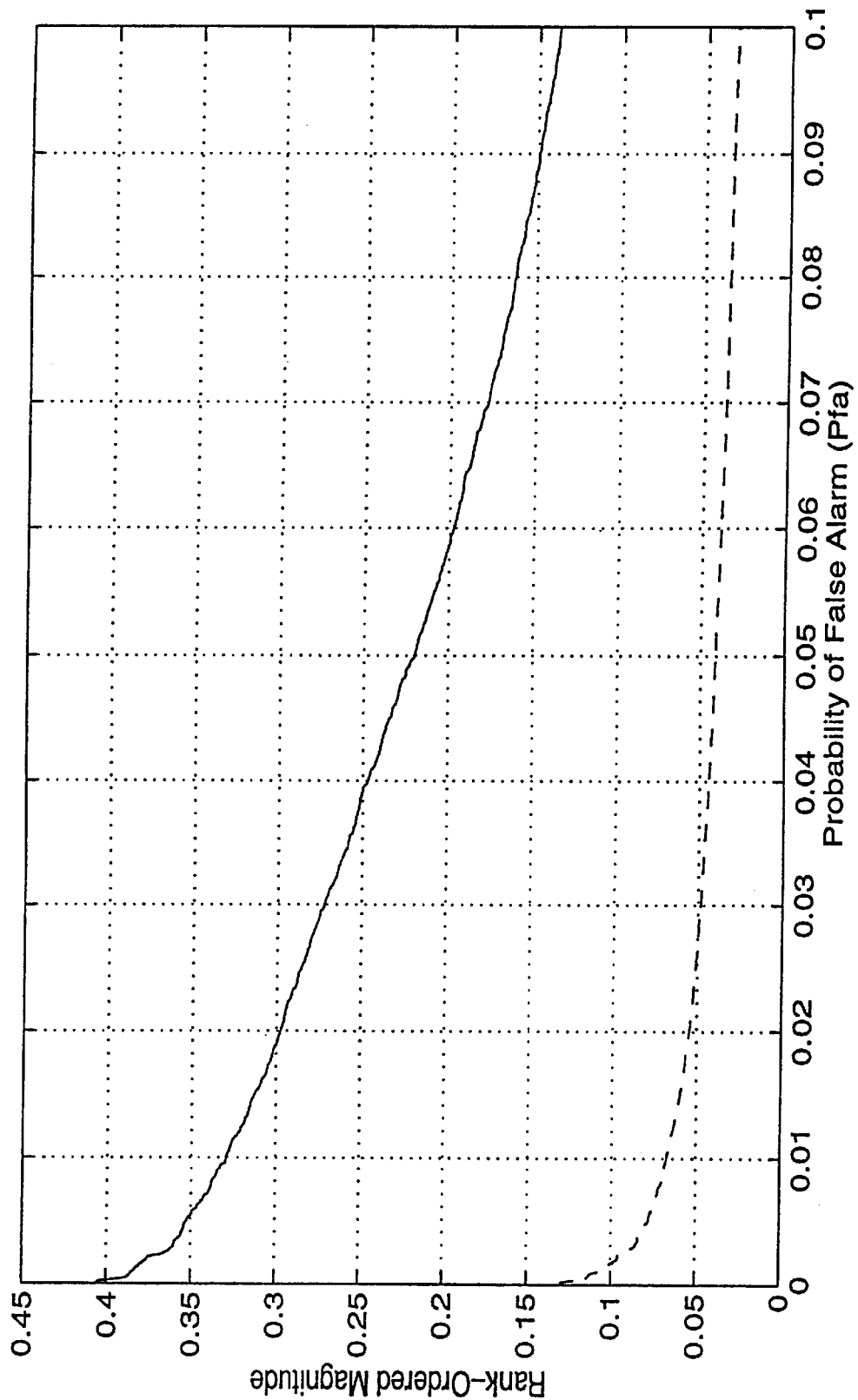
FIG. 11 is a graph of ROM curves of the disturbance estimates obtained by RC (solid line) and SALT (dashed line) processing when the disturbance is Cauchy for SNR=−10 dB.
Figure 12:
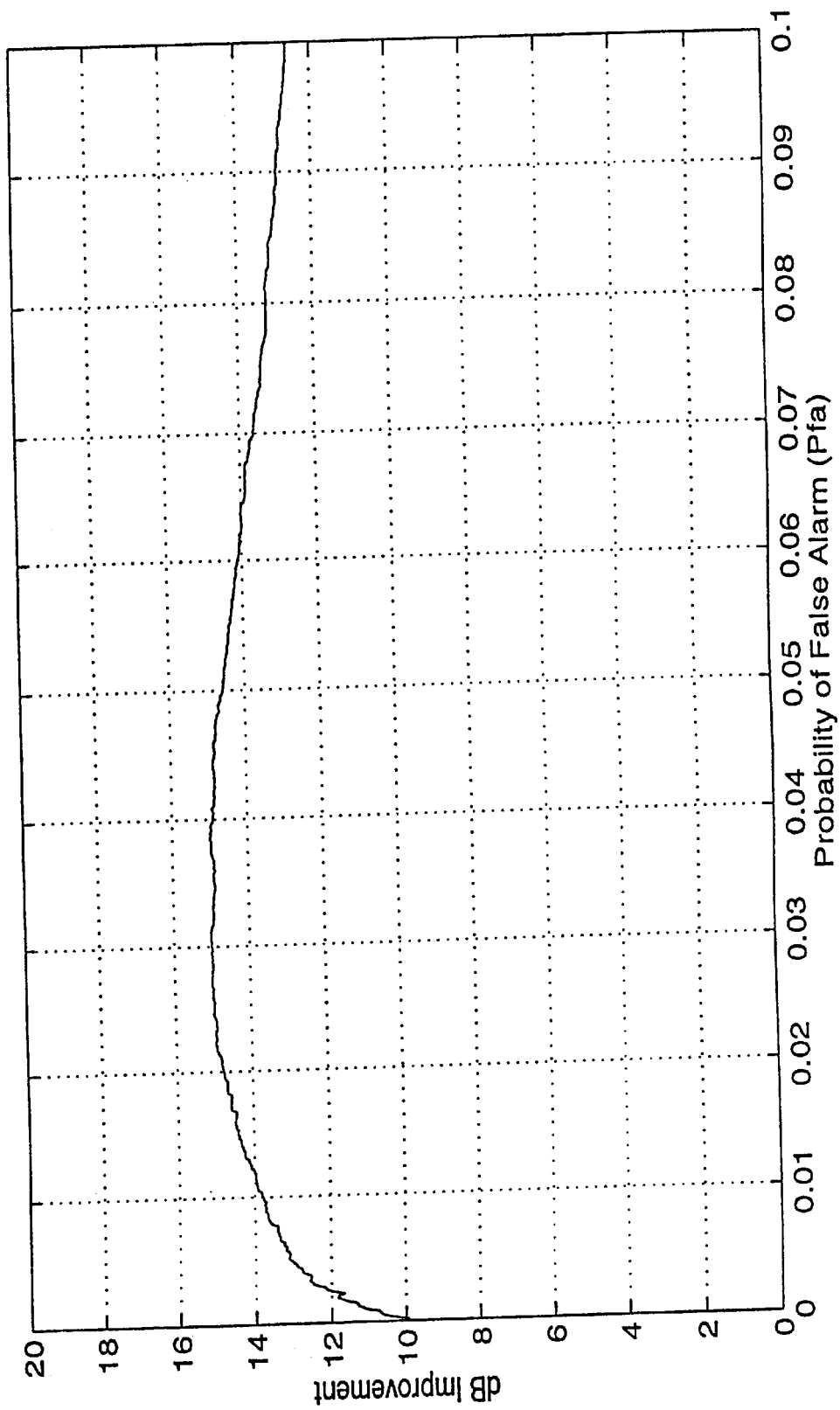
FIG. 12 is a graph of dB improvement in output SNR based on the ratio of the ROM curves of FIG. 10.

Another way to illustrate the improved target detection relative to the processed clutter/reverberation/noise values is the rank-ordered magnitude (ROM) curves which are formed by the processed rank-ordered clutter/reverberation/noise values after normalization by the peak target value. FIG. 11 shows the ROM curves obtained by RC (solid line) and SALT (dashed line) processing using 10,000 estimates of the Cauchy disturbances corresponding to SNR=−10 dB. The ROM curves can be viewed as "target exceedance" curves because they signify how much lower the processed background disturbance magnitude values are relative to the peak magnitude target value for each processing method. In order to obtain a measure of output SNR improvement in dB between the two processing methods, we compute the quantity: $20 \log_{10}$ (ratio of ROM curves), shown in FIG. 12 for this example. It is evident that the present invention (SALT processing) can effectively suppress clutter/reverberation/noise at least 10–15 dB, in this example, and provide significant target detection improvement Modifications of the described preferred embodiment can be configured without departing from the scope and spirit of the invention. Therefore, it is to be understood that, within the scope of the appended claims, the invention may be practiced other than as specifically described herein.

What is claimed is:

1. In an echo-location system, a method for adaptively estimating the target reflectivity sequence from received data that has been corrupted by non-Gaussian disturbances, said method comprising:

estimating the statistics of the prevailing non-Gaussian disturbance in the received data;

generating an approximate likelihood function from the estimated statistics of the prevailing non-Gaussian disturbances; and maximizing the likelihood function by applying an iterative gradient-descent algorithm to obtain the target reflectivity sequence.

2. The method of claim 1 or claim 3 wherein said estimating step comprises fitting the data to broad classes of parametric distributions to obtain a probability density function of the disturbances.

3. In an echo-location system, a method for adaptively estimating the target reflectivity sequence from received data that has been corrupted by non-Gaussian disturbances, said method comprising:

estimating the statistics of the prevailing non-Gaussian disturbances in the received data;

generating an approximate likelihood function from the estimated statistics of the prevailing non-Gaussian disturbances by obtaining a log-likelihood function; and maximizing the likelihood function to obtain the target reflectivity sequence.

4. The method of claim 3 wherein said maximizing step comprises an iterative process.

5. The method of claim 3 wherein said maximizing step comprises applying an iterative gradient-descent algorithm.

6. In a data reception system, a method for adaptively estimating the transmitted data from received data that has been corrupted by non-Gaussian disturbances, said method comprising:

estimating the statistics of the prevailing non-Gaussian disturbances in the received data;

generating an approximate likelihood function from the estimated statistics of the prevailing non-Gaussian disturbances; and maximizing the likelihood function by applying an iterative gradient-descent algorithm to obtain the transmitted data.

7. The method of claim 6 or claim 8 wherein said estimating step comprises fitting the data to broad classes of parametric distributions to obtain a probability density function of the disturbances.

8. In a data reception system, a method for adaptively estimating the transmitted data from received data that has been corrupted by non-Gaussian disturbances, said method comprising:

estimating the statistics of the prevailing non-Gaussian disturbances in the received data;

generating an approximate likelihood function from the estimated statistics of the prevailing non-Gaussian disturbances by obtaining a log-likelihood function; and maximizing the likelihood functions to obtain the transmitted data.

9. The method of claim 8 wherein said maximizing step comprises an iterative process.

10. The method of claim 8 wherein said maximizing step comprises applying an iterative gradient-descent algorithm.

11. In an echo location system, a method for adaptively estimating target-channel kernels h(k) from given transmitted data x(k) and given received data y(k) in the presence of severe noise, clutter and reverberation $\epsilon$(k), said parameters having the relationship y(k)=h(k)*x(k)+$\epsilon$(k), wherein * denotes convolution, said method comprising;

estimating the statistics of $\epsilon$(k) to obtain a probability density function p($\epsilon$);

constructing an approximate likelihood function based on p($\epsilon$) for N independent samples according to the relationship:

$$L(\epsilon_1, \epsilon_2, ..., \epsilon_N) = \prod_{n=1}^{N} p(\epsilon_n)$$

where:

$$\epsilon_n = y(n) \cdot \sum_{m=o}^{M} h(m)x(n-m)$$

and y(n) and x(n) are the n-th samples of the respective received and transmitted signals, and h(m) is the sought unknown discrete kernel values; and maximizing the likelihood function to obtain the estimated $\underline{h}$(m).

12. The method of claim 11 wherein said maximizing step comprises an iterative process.

13. The method of claim 12 wherein said iterative process comprises an iterative gradient-descent algorithm.

14. The method of claim 11 further comprising taking the log of the likelihood flnction:

$$\log L(\epsilon_1, \epsilon_2, ..., \epsilon_N) = \sum_{n=1}^{N} \log p(\epsilon_n).$$

15. The method of claim 14 wherein said maximizing step comprises:

$$\frac{\partial}{\partial h(m)} \log L(\epsilon_1, \epsilon_2, ..., \epsilon_N) = \sum_{n=1}^{N} \frac{\partial p(\epsilon_n)}{\partial h(m)} \bigg/ p(\epsilon_n).$$

16. The method of claim 15 wherein said maximizing step further comprises an iterative gradient-descent algorithm:

$$h^{(j+1)}(m) = h^{(j)}(m) + \gamma_j \frac{\partial \log L}{\partial h(m)}$$

where $\gamma_j$ is a possibly variable step size.

* * * * *